US012442659B1

(12) United States Patent
Ma

(10) Patent No.: US 12,442,659 B1
(45) Date of Patent: Oct. 14, 2025

(54) SYSTEMS AND METHODS FOR SUPERVISED MACHINE LEARNING FOR MATCHING ADDRESSES AND BUILDINGS

(71) Applicant: Amazon Technologies, Inc., Seattle, WA (US)

(72) Inventor: Puyang Ma, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 159 days.

(21) Appl. No.: 18/066,653

(22) Filed: Dec. 15, 2022

(51) Int. Cl.
  *G01C 21/00* (2006.01)
  *G01C 21/32* (2006.01)
  *G06Q 10/0835* (2023.01)

(52) U.S. Cl.
  CPC ......... *G01C 21/3819* (2020.08); *G01C 21/32* (2013.01); *G01C 21/3811* (2020.08); *G06Q 10/08355* (2013.01)

(58) Field of Classification Search
  CPC ............. G01C 21/3819; G01C 21/32; G01C 21/3811; G06Q 10/08355
  See application file for complete search history.

(56) References Cited

U.S. PATENT DOCUMENTS

| | | | | |
|---|---|---|---|---|
| 9,743,239 B1* | 8/2017 | Mishra | | H04W 4/023 |
| 10,410,090 B1* | 9/2019 | Wilczynski | | G06V 20/176 |
| 2005/0209781 A1* | 9/2005 | Anderson | | G06T 17/05 |
| | | | | 702/5 |
| 2012/0001936 A1* | 1/2012 | Kurata | | G09B 29/106 |
| | | | | 345/629 |
| 2012/0023106 A1* | 1/2012 | Kurata | | G09B 29/007 |
| | | | | 707/743 |
| 2016/0330592 A1* | 11/2016 | Crook | | H04W 4/02 |
| 2017/0330032 A1* | 11/2017 | Du | | G06F 18/22 |
| 2020/0041298 A1* | 2/2020 | Sheth | | G01C 21/3679 |
| 2021/0049224 A1* | 2/2021 | Zheng | | G06F 16/909 |
| 2021/0319059 A1* | 10/2021 | Vianello | | G06V 10/764 |
| 2023/0296406 A1* | 9/2023 | Melo | | G06F 16/909 |
| | | | | 701/532 |

FOREIGN PATENT DOCUMENTS

CN        105631627 A  *  6/2016

OTHER PUBLICATIONS

Machine Translation of CN-105631627-A (Year: 2016).*

* cited by examiner

*Primary Examiner* — Sahar Motazedi
(74) *Attorney, Agent, or Firm* — Eversheds Sutherland (US) LLP

(57) ABSTRACT

Systems and methods are provided supervised machine learning for matching addresses and buildings. Particularly, a machine learning model may be provided that is trained to identify a building outline within a map that is most likely associated with a given delivery address. A candidate set of buildings that may potentially be associated with the delivery address are determined and provided to the machine learning model. The machine learning model ranks the buildings included in the candidate set of buildings in terms of likelihood of being associated with the address. Based on this ranking, a building outline representing a building that is determined to be the most likely building associated with the address may be updated to include the address label on the map.

18 Claims, 10 Drawing Sheets

SYSTEMS AND METHODS FOR SUPERVISED MACHINE LEARNING FOR MATCHING ADDRESSES AND BUILDINGS

BACKGROUND

Building numbers included within building outlines presented on a map may provide important information used to guide delivery drivers to a building associated with a delivery address. These building labels reduce the likelihood of the delivery driver delivering the package to an incorrect building. Despite having address geocodes that are essentially delivery scans chosen from historical deliveries, many geocodes may not directly align with their corresponding building outlines, and some geocodes may be located between neighboring buildings in urban regions due to insufficient GPS accuracy and driver scanning habits. Although methods exist for creating a geographic database of the world, such as the OpenStreetMap (OSM), which also supplies building outlines along with building numbers, many building outlines still remain unlabeled in many regions.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

This disclosure relates to, among other things, devices, systems, methods, computer-readable media, techniques, and methodologies for supervised machine learning for matching addresses and buildings. Some building footprints (which may also be referred to herein as "building outlines") on a map carry labels such as building numbers (for example, as shown in at least FIG. 1), which may provide contextual information to assist a delivery driver in quickly locating a correct drop-off location for a delivery. However, these maps may often include at least some unlabeled buildings (or no labeled buildings), which may increase the difficulty of a delivery for a driver. Traditional methods for increasing the number of labeled buildings included on a map may involve the use of a heuristic method that matches an address geocode to a closest building and transfers the building number from the address text to the building outline on the map. In contrast, the method described herein uses a supervised ranking machine learning model that matches addresses with correct buildings with high precision and higher coverage than existing methods.

Figure 9:
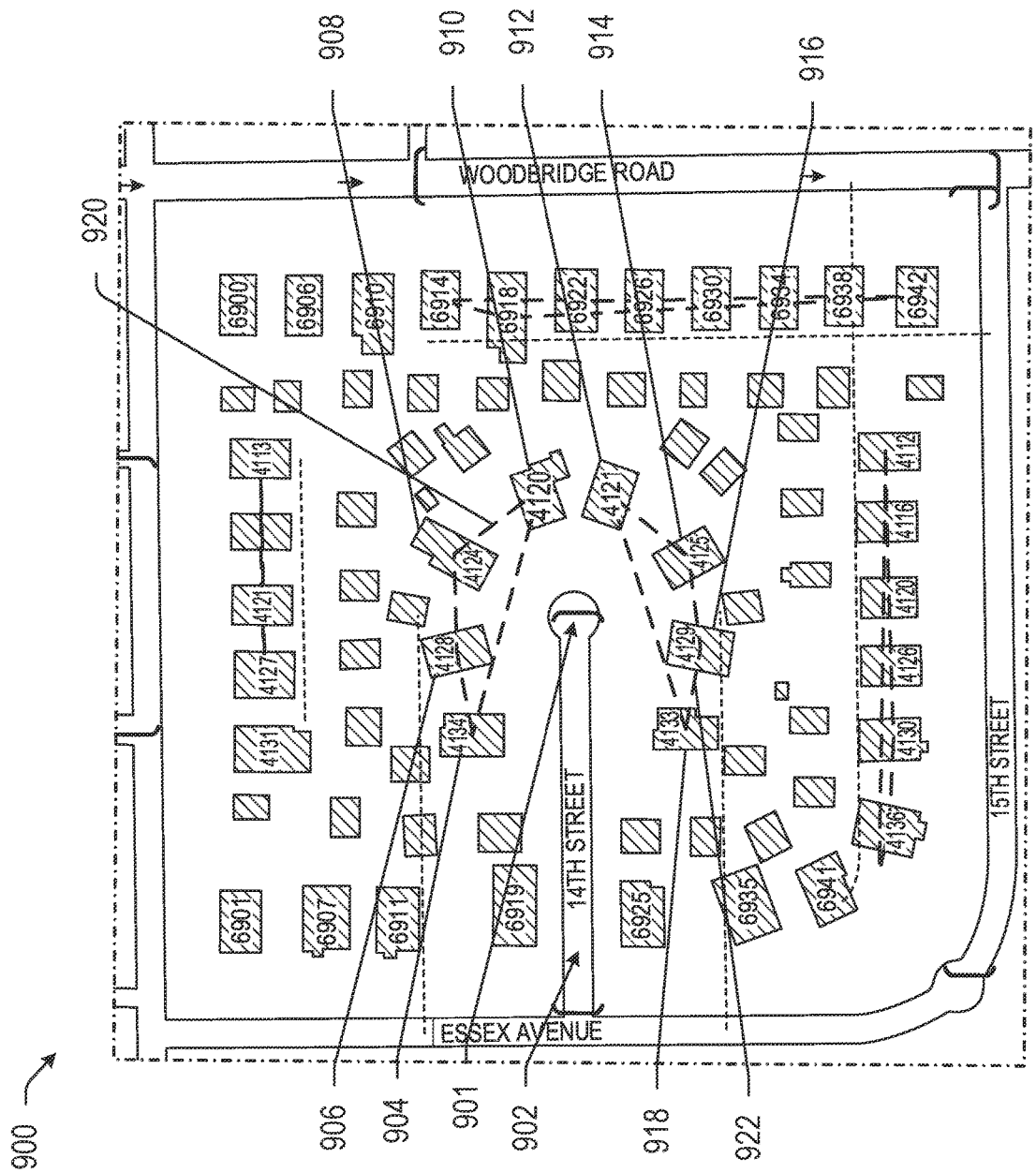
Figure 10:
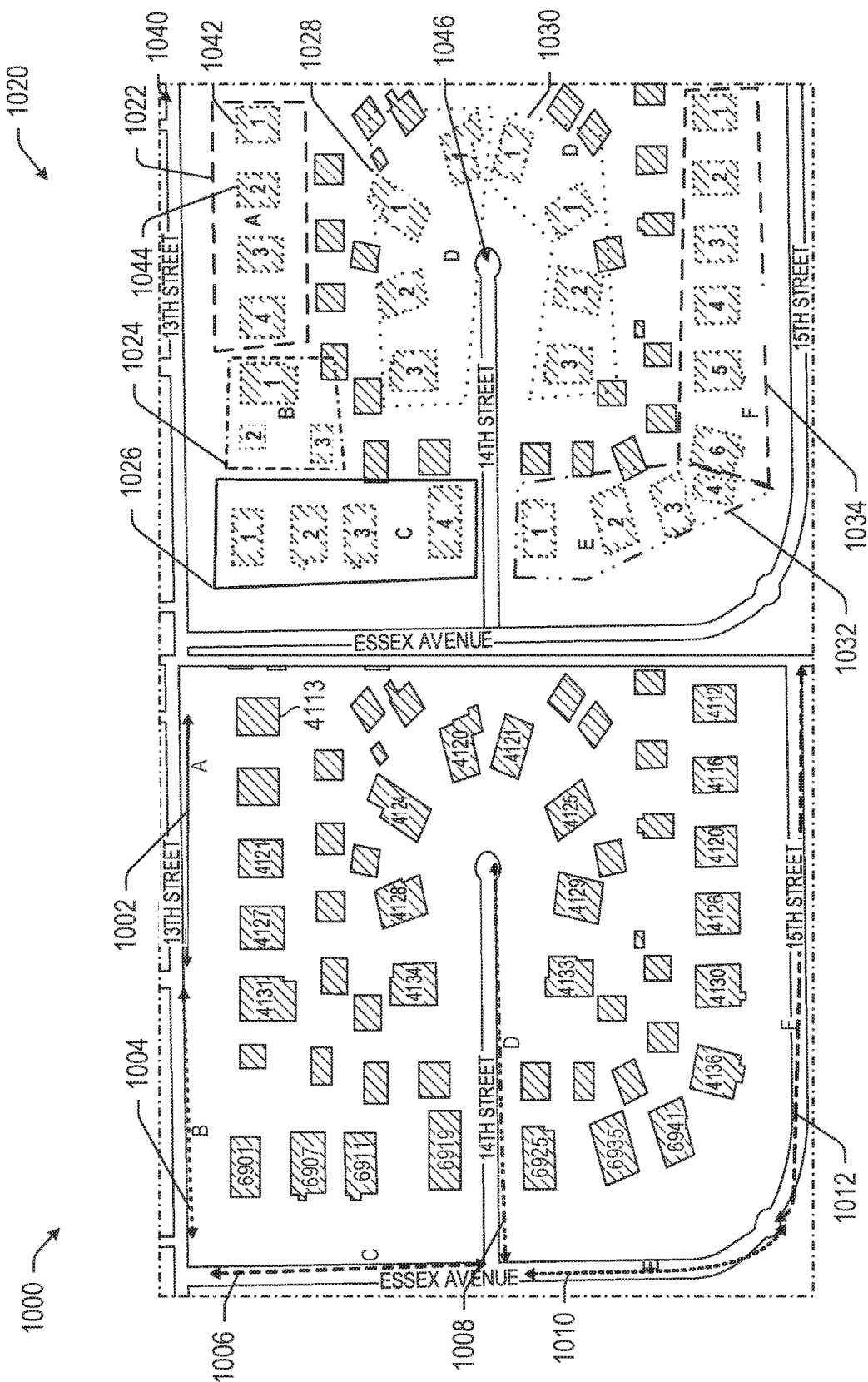
Figure 11:
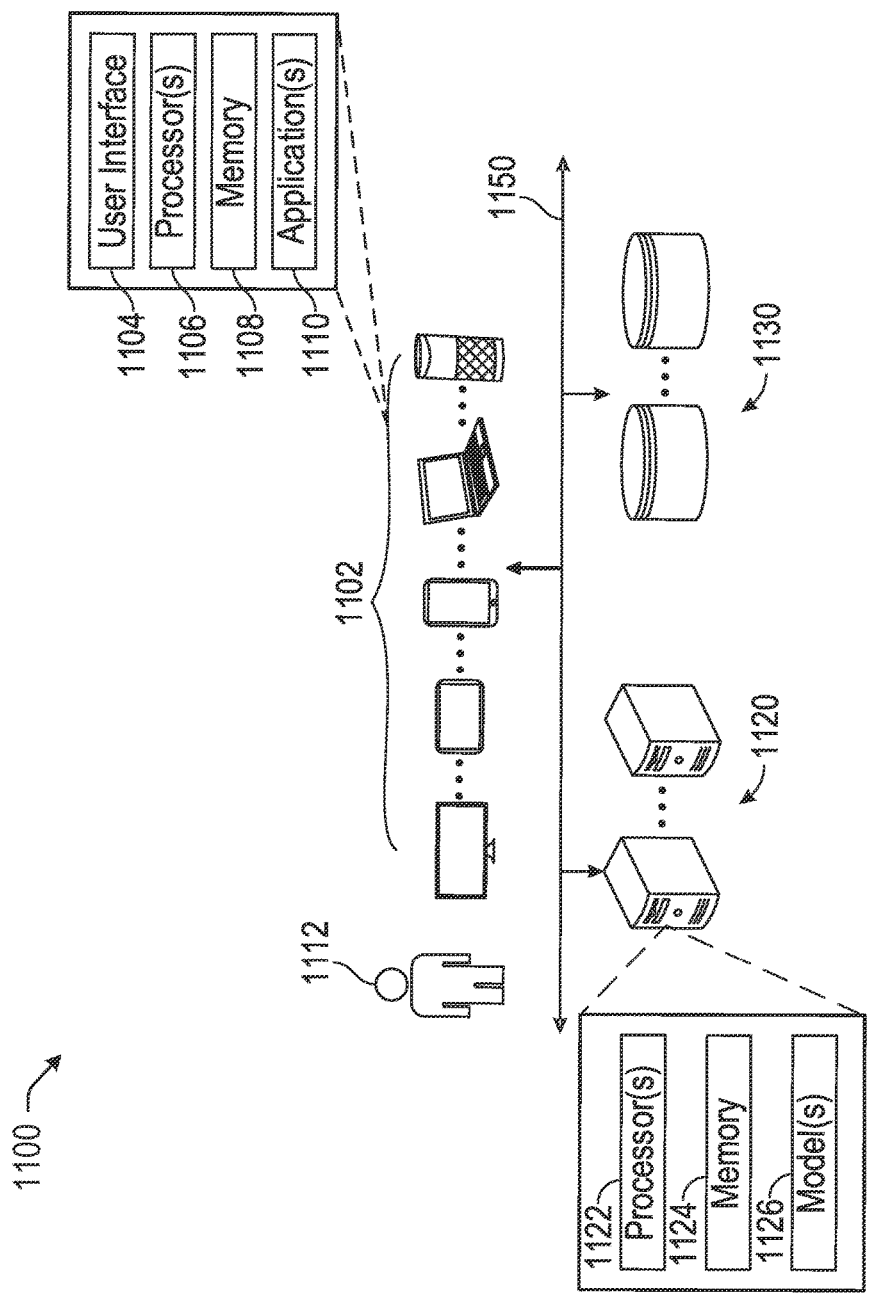
FIG. 11 illustrates an example system architecture in accordance with one or more example embodiments of the disclosure.

In one or more embodiments, the machine learning model generates more accurate address and building matches because instead of only relying solely on address geocodes (as is the case with existing methods), the machine learning model also uses address and building data (e.g., road segments, past delivery scans, building outlines, address geocodes, address texts, etc.) to train the model. To generate important model features that capture a building's neighborhood context, the method automatically assigns positional orders to buildings along a road for both simple and complex regions (this is illustrated in FIGS. 9-11). These positional orders enable the use of neighbor building information to determine if a candidate building is a reasonable match for an address. With more address and building matches generated from the machine learning model, at least the following benefits may be realized: (1) increasing labeled building coverage of the base map in multiple regions where the coverage is low; (2) directly improving delivery stop consolidation arrangements as trip planners design better group stops based on these address and building associations; and (3) reducing the likelihood of a delivered but not received (DNR) event occurring and increasing delivery efficiency due to more labeled buildings as visual cues for delivery drivers.

Figure 2:
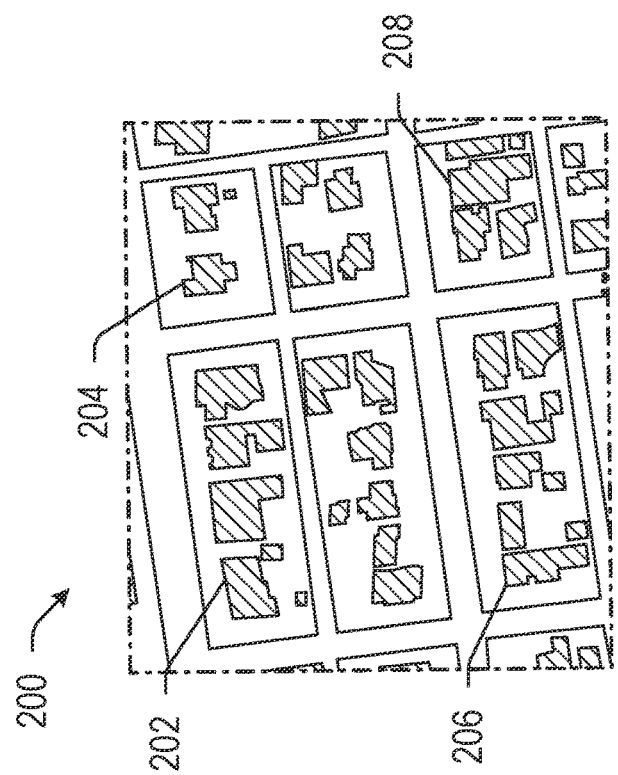
FIG. 2 illustrates an example map including unlabeled building outlines in accordance with one or more example embodiments of the disclosure.
Figure 1:
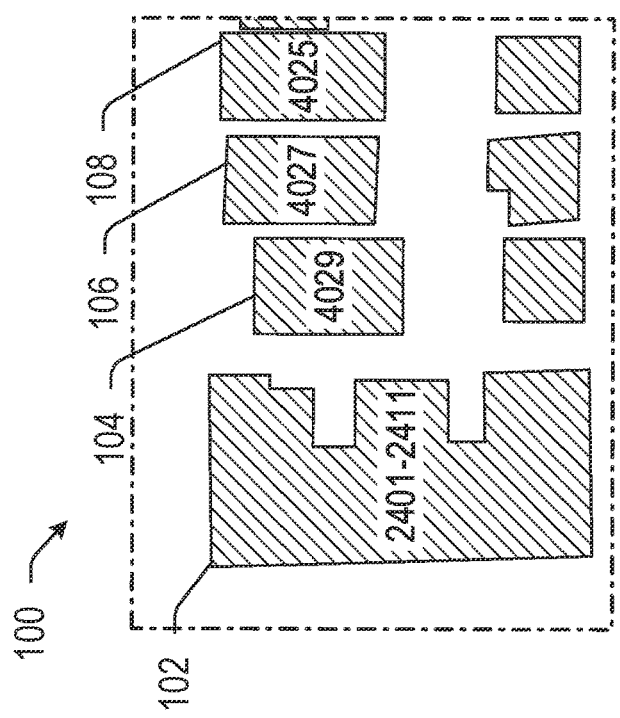
FIG. 1 illustrates an example map including labeled building outlines in accordance with one or more example embodiments of the disclosure.

Turning to the figures, FIG. 1 illustrates examples of labeled building outlines presented on an example map 100. For example, the map 100 shows a first building 102, a second building 104, a third building 106, and a fourth building 108 that include associated building numbers indicated on the map 100. In contrast, FIG. 2 shows another example map 200 illustrating an abundance of unlabeled buildings. For example, the map 200 shows at least a first unlabeled building 202, a second unlabeled building 204, a third unlabeled building 206, a fourth unlabeled building 208, and several other buildings that do not include associated building number labels. As illustrated in FIG. 2, a delivery driver that is provided with a map of a delivery area that includes the unlabeled buildings rather than the labeled buildings shown in FIG. 1 may result in a delivery driver experiencing an increased difficulty in identifying a correct building associated with a delivery address.

As aforementioned, previous attempts have been made to address the issue illustrated in FIG. 2 where a map including various buildings lacks building numbers associated with the buildings. One approach involves the use of a scalable heuristic algorithm that matches addresses to building outlines and use the building number in an address text to label its matched building. The inputs to the heuristic method include a Geocode1 file which may include a latitude and longitude point (for example, a geocode) representing each address and building polygons. The method may assign an address to a nearest building and may calculate a confidence score associated with the assignment. To achieve a production level precision of ≥99% precision, matches with less than 0.95 confidence and ambiguous numbers for a building are removed. The heuristic method is as follows.

(1) For each address:
(a) Get the latitude and longitude representation (geocode) of the address from the Geocode1 file.
(b) Among building candidates within a threshold radius, choose the nearest building.
(c) Compute a confidence score based on the geocode distance (disti) to the chosen building and to all other candidates.

$$\text{Confidence} = \alpha^{min(dist_i)} * \frac{\max(\beta^{dist_i})}{\sum \beta^{dist_i}},$$

where α and β are fixed values less than 1.
(2) Remove matches that label a building with ambiguous numbers.
(3) Remove matches with confidence score less than 0.95.

However, this approach may still result in unmatched addresses. Often, these unmatched addresses result from (1) low confidence values, (2) ambiguous building numbers (a building matched with multiple addresses of different building numbers has ambiguous number), or (3) missing building outlines from the map.

To address these deficiencies of the conventional heuristic method, a pair-wise ranking model is described herein that provides for automatic building labeling with high precision. Particularly, a supervised machine learning (ML) ranking problem may be employed, which may use features, such as building areas, past delivery scans around a building, a sequence of addresses, etc. to label significantly more unlabeled buildings than the conventional heuristic approach. The method automatically assigns positional orders of buildings along a road for both simple and relatively complex regions. These positional orders enable the use of neighbor building information to determine if a building is a reasonable choice for an address.

Since a building may have multiple building numbers or a single building number, a natural way to frame this matching problem is to choose the best building from potential building candidates for an address. A conventional delivery point (DP) model may use ranking to choose the best delivery scan point as the geocode (latitude, longitude representation) of an address, where a scan point may be a global positioning system (GPS) point that is generated when a driver scans a package for delivery completion. Although drivers are asked to scan a package only at its dropping location to indicate successful delivery, delivery scan points may not always represent the exact drop-off point of a delivery. For example, a delivery driver may instead provide an indication of a delivery scan inside the delivery vehicle, across the street from the delivery address, or at any other location other than the actual delivery location. Even if all drivers strictly follow the procedure, the package scan points can be inaccurate in urban environments. Thus, the pair-wise ranking model described herein may be used to compare delivery scan points for an address and choose the best point for package dropping.

Figure 3:
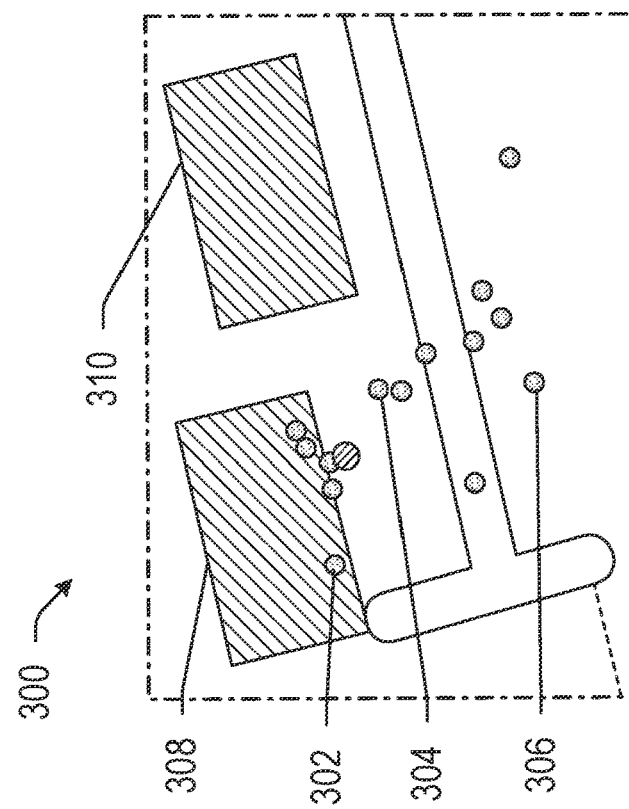
FIG. 3 illustrates an example map including delivery scan points in accordance with one or more example embodiments of the disclosure.

FIG. 3 shows a map 300 including one or more data points (for example, delivery scan point 302, delivery scan point 304, delivery scan point 306, and/or any other delivery scan points shown in FIG. 3), where each data point represents a delivery scan point for a delivery performed in association with the address in question (for example, a point at which a driver indicated that the delivery was completed). Thus, in theory, the delivery scan point should be proximate to the correct building associated with the address. However, as aforementioned, this may not always be the case, and particular delivery scan points may not necessarily match the exact drop-off location of the package.

Figure 4:
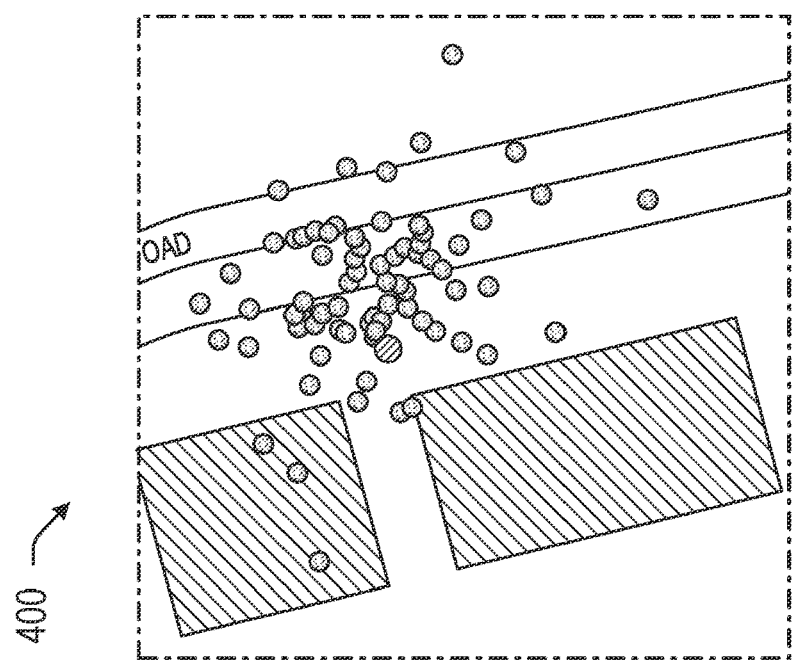
FIG. 4 illustrates another example map including delivery scan points in accordance with one or more example embodiments of the disclosure.

While the use of the delivery scan points shown in FIG. 3 provides some context as to where deliveries may have been performed for an address, FIG. 4 illustrates that there are also many cases where delivery scan points may lie between two different buildings. In such cases, it may be difficult to ascertain which building is actually associated with the address. While the delivery scan points illustrated in FIG. 3 tend to indicate that the address is more likely associated with the first building 308 than the second building 310, the delivery scan points illustrated in the map 400 of FIG. 4 do not provide as clear of an indication. Thus, traditional methods that may rely solely on these delivery scan points may not effectively identify a building associated with an address.

Thus, the method described herein may use a ranking approach using multiple candidate buildings for assigning an address to its correct building, rather than simply relying solely on delivery scan points to associate an address with a building. In this manner, the model used to select the best building for each address may be a pairwise ranking model, so that each address may be assigned to just one building, but a building may have multiple associated addresses. The input data for the model may be historical data relating to package scans performed within the delivery region, a road segment map, and building outlines within the delivery region's boundary. Additional details about this approach are provided below with respect to FIG. 7.

Turning to steps involved with the ranking machine learning methods described herein, a first step in the process may involve pre-processing any input data before such data is provided to the machine learning model. The pre-processing step may involve at least transforming the data to a form that is more suitable for use by the machine learning model. The pre-processing, for example, may involve at least removing ambiguous addresses, determining candidate buildings for an address, performing address normalization, determining building ordering along a road segment, and/or identifying non-delivery structures that may not be associated with an address, such as garages or sheds.

Figure 5:
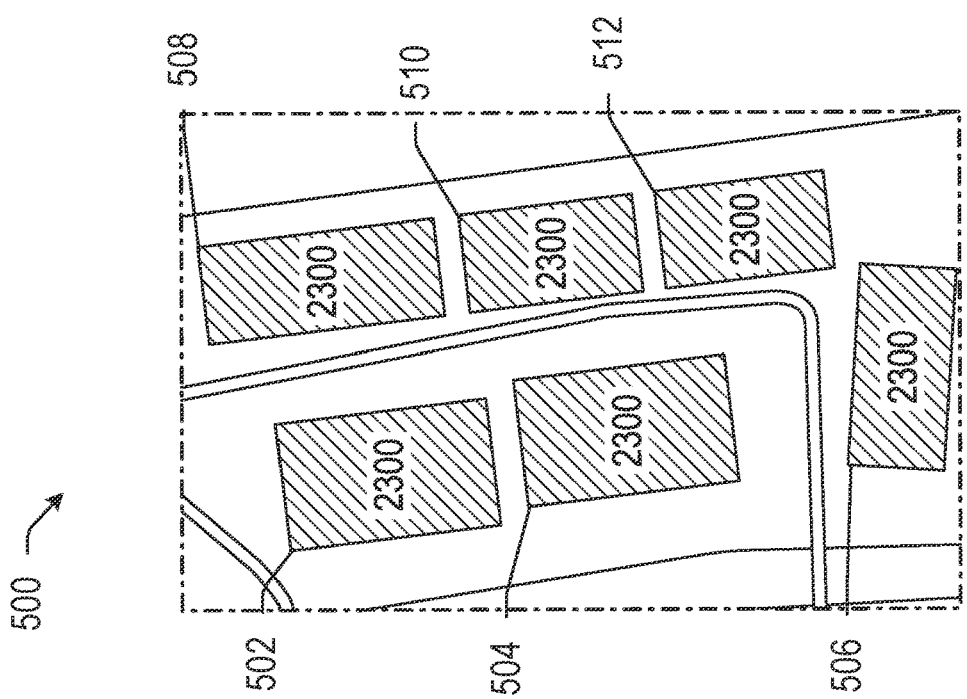
FIG. 5 illustrates an example map including ambiguous delivery addresses in accordance with one or more example embodiments of the disclosure.

Beginning with ambiguous addresses, some addresses have scans covering a wide range of buildings, and some addresses are associated with garden communities that should not be assigned to a single building. These types of ambiguous addresses may be removed, in one or more embodiments, using a balking classifier. FIG. 5 illustrates an example map 500 including multiple buildings that may share the same address text. For example, the map 500 shows a first building 502, second building 504, third building 506, fourth building 508, fifth building 510, and sixth building 512 all including the address label "2300." For such an address, the delivery scans may be dispersed among the six buildings, which may align with the assumption of an address belonging to only one building. Thus, the balking classifier from the DP model may be used to separate single building addresses (including high-rise buildings) from these kinds of garden community addresses.

Continuing with determining candidate buildings, as aforementioned, given that the machine learning model may be a ranking model that selects the best building outline of out a set of buildings that exist in a general region associated with an address, candidate buildings may need to be identified for each address. These candidate buildings may be identified by generating an "envelope" (also referred to herein as a "bounding box"). Any building outlines on the map that are encompassed by the envelope and/or are touched by the envelope may be considered candidate buildings for the address.

For each address, the envelope may be formed using the delivery scan points associated with the address (for example, as illustrated in FIGS. 3-4). For each delivery scan point, an associated kernel density estimation (KDE) value may be determined. KDE is a statistical approach for determining an estimated probability density for a particular variable. For example, a 2D exponential kernel may be used to calculate the KDE scores for each delivery scan point. In one or more embodiments, an exponential kernel with a bandwidth of 25 meters may be used to calculate KDE scores. However, the KDE values may be determined in any other suitable manner.

When all of the KDE values for the delivery scan points are determined, a delivery scan point associated with a maximum KDE value (the "maximum KDE delivery scan point") may be identified. A delivery scan point associated with the second highest KDE value may also be identified (the "second maximum KDE delivery scan point"). In one or more embodiments, these two delivery scan points may then be used to generate the envelope. This may be accomplished by creating a line segment between the maximum KDE delivery scan point and the second maximum KDE delivery scan point. Then, the smallest rectangle that would fit the line segment as a diagonal from one corner of the rectangle to another would form the envelope. Once the initial envelope is created using the two delivery scan points, the envelope optionally may be expanded by a particular distance. Buildings that intersect with the final envelope are identified as candidate buildings for the address. While this envelope may not necessarily encompass all of the delivery scan points (in some cases, it may), the envelope should encompass a majority of the delivery scan points or at least the most accurate delivery scan points.

The use of the rectangular envelope is merely one manner in which an envelope may be determined and is not intended to be limiting. Another example envelope may involve generating a circular envelope by creating a circle with a given radius around the maximum KDE delivery scan point). The envelope may also be generated in any other suitable manner. Additionally, the manner in which the envelope is determined may also be modified depending on certain factors. For example, depending on GPS accuracy associated with a given region, the amount the envelope is expanded from the initially determined envelope may either be increased or decreased. The envelope may also be modified from an initial envelope based on any number of other factors as well.

Figure 7:
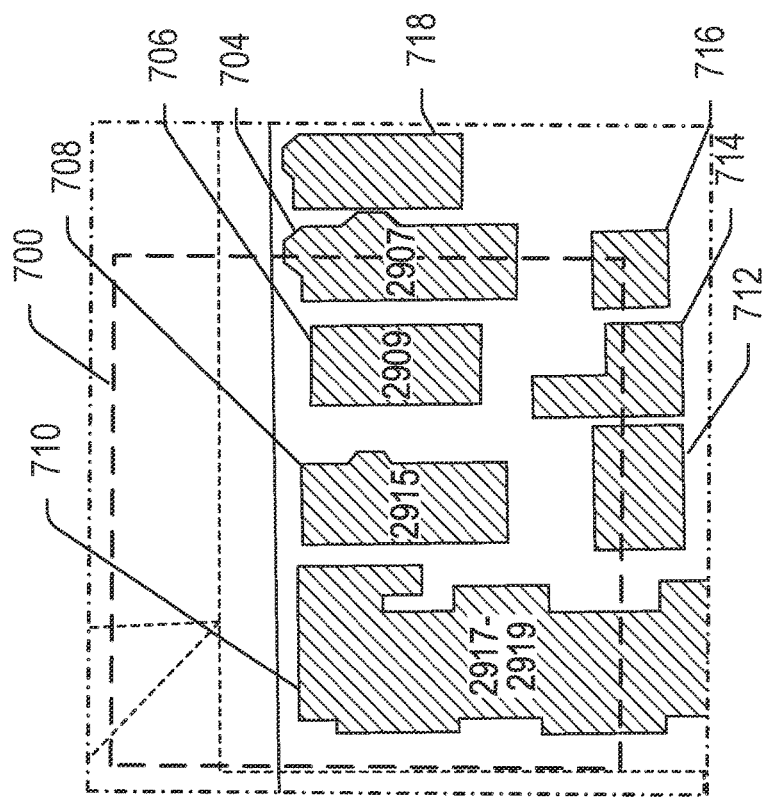
FIG. 7 illustrates an example map including a bounding box in accordance with one or more example embodiments of the disclosure.

FIG. 7 illustrates an example of an envelope 700 generated to identify candidate buildings to associate with a particular address. As shown in FIG. 7, the envelope 700 contacts (and/or encompasses) seven buildings within the particular region (for example, a first building 704, a second building 706, a third building 708, a fourth building 710, a fifth building 712, a sixth building 714, and a seventh building 716). Thus, all seven of these buildings may be considered candidate buildings for the address associated with the envelope 700. However, the eighth building 718 that is outside of the envelope 700 may not be considered one of the candidate buildings. Although the figure illustrates that the envelope 700 only needs to come into contact with a building outline for the building to be considered a candidate, this is not intended to be limiting. For example, it may be required that the entirety of the building outline be encompassed by the envelope 700 in order for the building to be considered a candidate or that a threshold area of the building outline be encompassed by the envelope 700.

Figure 6:
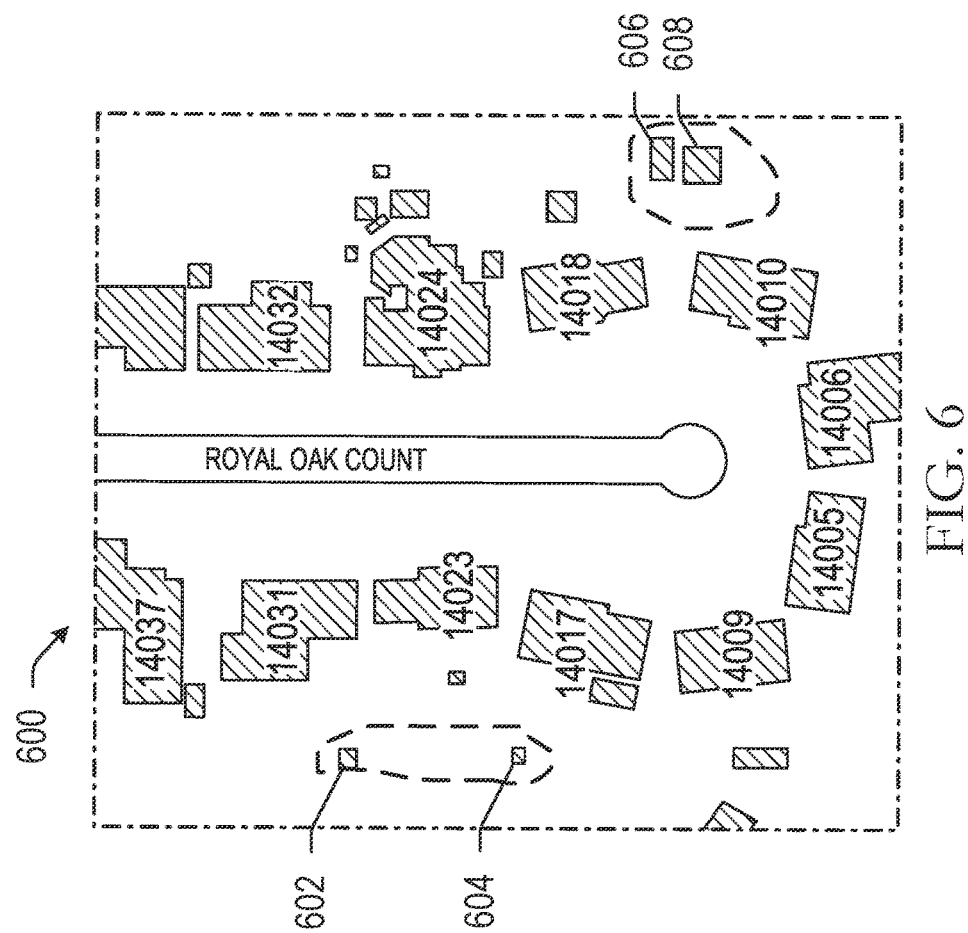
FIG. 6 illustrates an example map including non-delivery buildings in accordance with one or more example embodiments of the disclosure.

Additionally, before identifying such candidate buildings, non-delivery structures that may not be associated with an address may be filtered out as shown in FIG. 6. This mitigates or prevents scenarios where building addresses may be incorrectly assigned to a building outline on a map that is actually associated with one of these non-delivery structures, such as a garage, a shed, and/or any other type of structure that normally may not be associated with an address. For example, FIG. 6 shows first structure 602, second structure 604, third structure 606, and fourth structure 608 that are identified as being structures not associated with an address. In one or more embodiments, such structures may be identified based on a size of the building outlines included on the map 600. Any building outlines that are less than a threshold size may be considered non-residential structures. For example, the threshold size may be 30 meters squared and/or any other size. Non-delivery structures may also be identified in any other manner as well. As one additional example, a satellite image of the area associated with the map may be leveraged to identify such non-delivery structures.

Address normalization may also be performed to ensure that all addresses are converted into a standard format for processing by the model. For example, the addresses may be formatted with a structure, such as "APT Number!Building Number!Street Name!City!County!State!Country" (this is merely an example address format and any other type of standard format may be used). Despite being a normalized format, due to different input habits and accidental misspellings, the input address may still have different strings for the same word such as "apt." "apartment," "room," and "rm." Moreover, presence or absence of spaces may result in different strings for the same address. For example, "Neal Crest Cir" and "NealCrest Cir" may refer to the same street. These issues may be resolved by further normalizing each address using common address abbreviations and removing unnecessary spaces.

In many cases, building numbers follow a sequential order along a street. For example, a first building number at the start of a road may be 101, a second building number may be 102, a third building number may be 103, etc. This information may be captured by assigning positional orders to buildings along a road segment, thereby obtaining possible information of a candidate building's neighboring buildings for some feature generation. Automatically assigning building position orders may be challenging as it is not a given which road segment a building is associated with. Additionally, many non-residential structures tend to be positioned near main buildings and may introduce noise in the building order determination.

To perform this association between a building and a road segment located nearby the building, a search may first be performed to identify road segments within a threshold distance of the building. If multiple road segments are identified, this group of road segments may be narrowed down to a single road segment by identifying the road segment that includes a name that matches a portion of the building address. If either the road name or the building's street label is absent, the road segment closest to the building's centroid may be selected. A heuristics method may also be used to automatically estimate an order of buildings for both simple and relatively complex regions. After associating buildings with a road segment, the segment may be shifted to the direction of its associated buildings by the average distance to their centroids. If the shifted line crosses most buildings, position orders for all of these buildings may be generated by projecting their centroids onto the road and assigning sequential numbers based on the projected points' position on the road.

Figure 8:
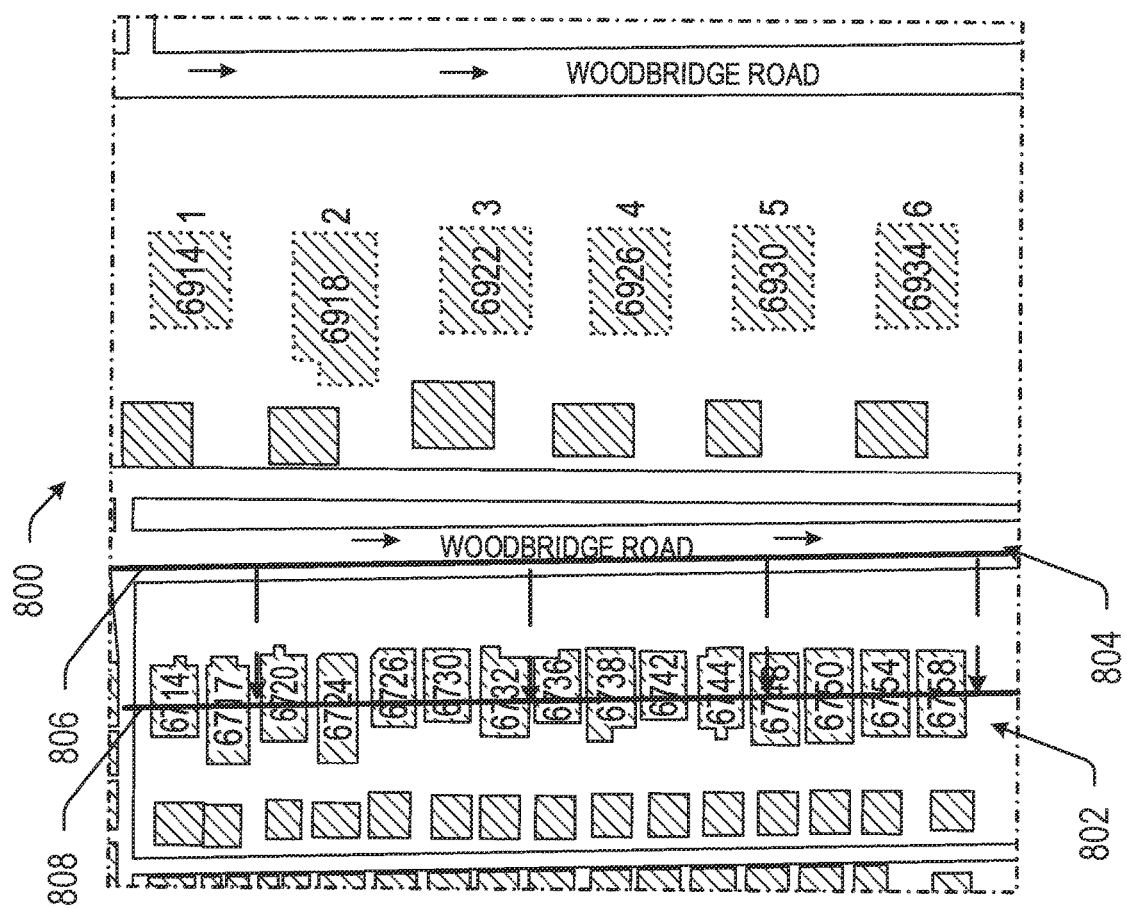
FIGS. 8-10 illustrate an example process for determining a building order sequence in accordance with one or more example embodiments of the disclosure.

FIG. 8 illustrates the process for determining positional orders for a sequence of buildings 802 presented in a single-file row in an example map 800. As aforementioned, the first step in the process may involve identifying road segments within a threshold distance of the sequence of buildings 802. The map 800 shows that a road 804 ("Woodbridge Road") runs parallel to the sequence of buildings 802. The road 804 may be identified as a road segment to be associated with the sequence of buildings 802 based on at least one of: (1) the road 804 being within a threshold distance from one of the buildings (referred to herein for convenience as the "first building") included in the sequence of buildings 802; and (2) the road name being included in a known address associated with one or more of the buildings included in the sequence of buildings 802. For example, if it is known that a first building includes an address of 9714 Woodbridge Road or if the building number is unknown, but it is known that the building address includes at least Woodbridge Road in the address.

Once the road 804 is identified as satisfying at least one of these criteria, a line segment 806 may be generated that runs lengthwise through the road 804. The line segment 806 may then be shifted toward the sequence of buildings 802 by a distance that is equivalent to a distance between a centroid of the first building and a corresponding centroid of the road 804 (for example, the distance would be perpendicular with the line segment 806 such that the distance is the shortest distance between the centroid of the first building and the road 804). However, the distance may also be measured from any other point within the outline of the first building and any other point within the first road as well. This shifted version of the line segment 806 is shown as line segment 808 in FIG. 8. In one or more embodiments, the line segment 806 may also be shifted by an average distance to the centroids of some or all of the buildings in the sequence of buildings 802 and/or any other distance. As aforementioned, if the shifted line crosses a threshold number of the sequence of buildings 802 (FIG. 8 shows the line segment 808 crossing all of the buildings in the sequence of buildings 802), position orders for all of these buildings may be generated by projecting their centroids onto the road and assigning sequential numbers based on the projected points' position on the road (the position order assignment is illustrated in FIG. 10). This threshold number may be any number, such as a majority of the buildings, half or more than half of the buildings, and/or any other percentage of the buildings.

In complex regions, such as the region included within the map 900 illustrated in FIG. 9, non-delivery structures, such as garages or sheds may often scatter around main residential buildings. In these types of regions, the shifted road segment (for example, illustrated in FIG. 8) may not intersect at least a threshold number of main buildings (for example, residential or commercial buildings associated with an address). To avoid assigning position orders to these types of structures, another method for identifying an order of a sequence of buildings may involve generating convex hulls rather than a straight-line segment as shown in FIG. 8. The convex hull of a set of points may be defined as the smallest convex polygon that encloses all of the points in the set. The term convex may indicate that the polygon has no corner that is bent inward. Particularly, a convex hull for a sequence of building outlines that are not necessarily provided in a straight line may be generated by connecting line segments provided between the centroids of each of the buildings in the sequence of building outlines. Positional orders may be assigned to buildings intersecting with the convex hull.

As an example of this alternative approach, FIG. 9 shows a set of building outlines provided around a cul-de-sac 901 of a road 902 (for example, a first building 904, second building 906, third building 908, fourth building 910, fifth building 912, sixth building 914, seventh building 916, and eighth building 918). As illustrated in FIG. 9, the set of building outlines are not provided in a straight-line configuration as the sequence of buildings 802 in FIG. 8. FIG. 9 shows a first convex hull 920 generated between the first building 904, second building 906, third building 908, and fourth building 910. FIG. 9 also shows a second convex hull 922 generated between the first building 912, second building 914, third building 916, and fourth building 918.

FIG. 10 provides another illustration of a process for assigning positioning orders to various sequences of buildings within a map including a complex region. FIG. 10 shows a first map 1000 and a second map 1020 shown adjacent to the first map 1000. The first map 1000 on the left shows an example segmentation of the various roads found in the region into individual road segments (for example, a first segment 1002, a second road segment 1004, a third road segment 1006, a fourth road segment 1008, a fifth road segment 1010, and a sixth road segment 1012). The manner in which these example roads are split into road segments is merely exemplary. The various roads may also be split into any other number of road segments as well.

The second map 1020 illustrates the segmentation of all of the buildings that are likely to be associated with a delivery address (not including structures such as garages, sheds, etc.) into various sequences (e.g., groupings) of buildings. For example, a first sequence of buildings 1022 associated with the first road segment 1002, a second sequence of buildings 1024 associated with the second road segment 1004, a third sequence of buildings 1026 associated with the third road segment 1006, a fourth sequence of buildings 1028 and a fifth sequence of buildings 1030 associated with the fourth road segment 1008, a sixth sequence of buildings 1032 associated with the fifth road segment 1010, and a seventh sequence of buildings 1034 associated with the sixth road segment 1012.

FIG. 10 also illustrates position orders assigned to the buildings in each of the sequences of buildings. As described in FIG. 8, position orders for the building outlines included in each sequence of buildings may be generated by projecting the centroids of each of the building outlines onto the associated road segment (however, any other distance between a point in a building outline and a point on the road segment instead of the centroids may also be used). A distance between each of the projected points on the road segment and a starting point of the road segment may then be determined. Finally, the position order of each of the buildings in the sequence of buildings may then be determined using these calculated distances.

As one example, the first road segment 1002 associated with the first sequence of buildings 1022 may include a starting point 1040. Although not shown in the figure, the centroids of each of the four buildings included in the first sequence of buildings 1022 may be projected onto the first road segment 1002 (for example, projected onto a point in the first road segment 1002 that is a closest distance to the centroid of respective building). The distance between each projected point on the road segment 1002 for each of the four buildings and the starting point 1040 may then be calculated. As shown in FIG. 10, the first building 1042 is located closest to the starting point 1040, so the distance between the projected point on the road segment 1002 that is associated with the first building 1042 and the starting point 1040 likely may be the smallest distance of the four buildings. Thus, the first building 1042 is assigned the position order "1," as shown on the second map 1020. The same logic is applied to assign the position order "2" to the second building 1044, and so forth. While FIG. 10 shows these order sequences as being presented on the respective building outlines, this is merely for purposes of illustrating the order that is assigned to the buildings and may not necessarily mean that the order is presented in such a manner on the map that is displayed to a user. Rather, building labels instead may be provided within the building outlines once the labels are determined by the model as described herein.

In some scenarios, a particular road segment may include associated buildings on either side of the road segment. For example, the second map 1020 shows that the fifth road segment 1008 is associated with both the fourth sequence of buildings 1028 and the fifth sequence of buildings 1030. In such scenarios, separate positional orders may be generated for each of the fourth sequence of buildings 1028 and the fifth sequence of buildings 1030. Continuing this example, rather than the eight building outlines included within the fourth sequence of buildings 1028 and the fifth sequence of buildings 1030 being associated with position orders 1-8, FIG. 10 shows that the position orders reset back to "1" between the fourth sequence of buildings 1028 and the fifth sequence of buildings 1030.

FIG. 10 also illustrates that some of the buildings included in the fourth sequence of buildings 1028 and the fifth sequence of buildings 1030 are assigned the same position order. If buildings on one side of a road segment have the same projected point onto the road segment, then they may be provided the same positional order along that road segment. One example of a scenario where this may occur is when building outlines are provided around a circular portion of a road segment, such as the cul-de-sac 1046 associated with the fourth road segment 1008.

Once all of the input data has been pre-processed as described above, one or more feature vectors may be provided to the ranking machine learning model. In one or more embodiments, two different types of feature vectors may be provided to the ranking model. The first feature vector may include building features of a candidate building for an address. The second feature vector may include background features that are specific to an address but have the same values for all candidate buildings. For the pairwise ranking model, differences between a pair of buildings and some address background features form a feature vector with a binary target of whether a first building is better than a second building to associate with a particular address. While reference is made to two feature vectors including particular types of information being provided to the model, any other types of data described herein or otherwise may also be provided to the model as well.

The building features included in the first feature vector may include, for example, KDE distance, geocode distance, "in between," inside building scan share, soft vote share, average scans distances, relative building area, name difference, etc. The building features may also include any other information as well.

KDE distance may refer to the shortest distance in meters between a building and the max KDE score point calculated from the most recent number of delivery scans (or all scans) of an address. An exponential kernel with a bandwidth of 25 m (or any other value) may be used to calculate KDE scores. Geocode distance may refer to the shortest distance between a building and the latest DP point of an address. "In between" may refer to whether the address text has a building number that fits in the candidate building's previous and next building neighbors. The possible values may be, for example, "true," "false," and "none" (in case the previous and next neighbor buildings' numbers are unknown). For example, for an address with building number 10, if a candidate building's previous neighbor is labeled 9 and the next neighbor is labeled 12 then the value is True. Inside building scan share may refer to a ratio of scans in this building among scans inside any building. Soft vote share may refer to each package scan of an address cast a partial vote to a candidate building that is inversely proportional to the distance between the scan and the building. The soft vote share may be the fraction of all partial votes a building gets for an address. Average scans distances to a building may refer to the average of an address's package scans distances to a building. Relative building area may refer to a Z-score value of a building outline's area among the areas of all candidate buildings for an address. Name difference may refer to the minimum absolute difference between an address's building number and a building's labeled numbers if any exist. For an address with building number 944, the building name difference may be two compared to a building labeled 946, etc. Position mean may refer to absolute mean of non-NaN differences between an address's building number and a building's neighbors' labeled numbers.

The background features of an address may include, for example, information such as maximum soft vote share, a number of candidate buildings, a ratio of scans within 5 m and within 20 m (or any other distances) of a building, and/or the average building area of candidate buildings. The background features included in the second feature vector may also include any other information. After forming all possible pairs of buildings from candidate buildings of an address, a feature vector may be provided in the form of (u-v, c), where "u" refers to the left building features, "v" refers to the right building features, and "c" represents the common background features of an address.

In one or more embodiments, the list of candidate buildings may be grouped into pairs of candidate buildings such that pairs including all possible combination pairs of the candidate buildings are formed. Once these candidate buildings pairings are formed, the model may use the input data to determine, for each pair of candidate buildings, which candidate building of the two candidate buildings has a higher likelihood of being associated with the address. This probability for each pair may be the output of the model. Every time a building is associated with a higher probability value (e.g., a building "wins" over its candidate building pairing), a count associated with the building may be incremented. The building with the most "wins" among the candidate building pairs (e.g., the highest count) may then be assigned the address and the address label may be provided within the building outline corresponding to that building on the map. That is, a second map may be generated including an indication of the first address within a first building outline representative of a first building (e.g., the building with the most "wins").

As a simplistic example, a set of candidate buildings may include a first candidate building, a second candidate building, and a third candidate building. Thus, the possible pairings of these three candidate buildings may include a first pairing including the first candidate building and the second candidate building, a second pairing including the first candidate building and the third candidate building, and a third pairing including the second candidate building and the third candidate building. If it is determined that the probability value is higher in favor of the first candidate building for the first and second pairing and the probability value is higher in favor of the second candidate building for the third pairing, then the first candidate building has a "win" count of two and the second candidate building has a win count of one. In this example, the first candidate building would then be associated with the address.

With respect to the training of the model, certain ground truth data may be established. In order to have a model generalizable to a number of different regions, the model may be trained with data associated with different representative types of regions to create the ground truth data (for example, medium building density regions, high building density regions, and mixed building density regions). However, the model may be trained with any other types of data sets as well. To generate ground truth building and address pairs, the nearest building for each address geocode from package scans data and the Geocode1 file may be determined. Those with the same building for both types of geocode and agreeing building labels and address texts may be kept.

In terms of the model training itself, the ground-truth dataset may be split into a portion of training data and a portion of testing data (for example, 75% of the data may be used for training and 25% of the data may be used for testing the trained model). However, any other amount of data may be used for training, and any other amount may be used for testing as well. For each address, every candidate building may be paired with the correct building of an address to compute feature vectors described above. Buildings may be randomly selected as a left or the right building in the pairs of possible candidate buildings to create the binary target, which indicates whether the left building is a better match than the right building for an address. We then trained and tuned a random forest binary classification model may then be trained and tuned with five-fold stratified cross-validation and selected the best model based on highest accuracy and score on the test set. Finally, to get the model output for an address, building that wins (determined by a model threshold) over all other candidates in comparison as the best building for that address may be selected. Although there may be more than 25 features used in the ranking model, the top 10 important features are as expected include some of the major differences among candidate buildings, such as the building's distance to an address's delivery point, the building's name (if available) difference with an address text, the proportion of an address's package scans inside a building, etc. It should be noted that this is merely an example of a manner in which the model may be trained and tested before use in real-time to match addresses to buildings and is not intended to be limiting in any way.

Additionally, the training may be used to determine feature importance. For example, the model may update weighting values provided to different features in the feature vectors based on training data and/or real-time processing performed by the model using data.

FIG. 11 is an illustration of an example system 1100 in accordance with one or more example embodiments of the disclosure. In one or more embodiments, the system 1100 may include at least one or more user devices 1102, one or more computing systems (for example, computing system 1120 and/or any other computing system), and/or one or more databases 1130. However, these elements of the system 1100 are merely exemplary and are not intended to be limiting in any way. For simplicity, reference may be made hereinafter to a "user device 1102," a "computing system 1120," and a "database 1130"; however, this is also not intended to be limiting and may still refer to any number of such elements.

The user device 1102 may be any type of device (for example, a desktop or laptop computer, tablet, smartphone, and/or any other type of device) that is used by a user 1112 to perform a delivery. The user device 1102 may include an application 1110 that may present a map to a user 1112. The methods described herein may allow a map to be presented through the application 1110. The map may include one or more labeled building outlines including address information to assist the delivery driver in identifying a correct building associated with a delivery address.

The computing system 1120 may be a local or remote system (for example, a server and/or any other type of computing system) that is used to perform any of the functionality described herein with respect to determining a building on a map that is associated with a given delivery address. For example, the computing system 1120 may host the one or more model(s) 1126 used to make this determination. The computing system 1120 may also be responsible for training and/or testing the model 1126, performing data pre-processing before any data is provided to the model 1126, creating feature vectors to provide to the model 1126, and performing any other types of tasks described herein. The computing system 1120 may also include one or more processors 1122 and memory 1124. Any of these tasks may be split across multiple computing systems and/or with the user device 1102 as well.

The database 1130 may refer to a data storage component that may be used to store any of the data that is described herein. For example, the database 1130 may store map information, including building outlines for given regions, historical data, such as prior delivery scan points for a given address, and/or any other types of relevant data. This data may also be stored on any other components of the system 1100, such as the user device 1102 and the computing system 1120 as well. This data may be accessed by any of the other components of the system 1100, such as the user device 1102 and/or the computing system 1120 to perform any of the processing described herein.

In one or more embodiments, any of the elements of the system 1100 (for example, the user device 1102, computing system 1120, the database 1130, and/or any other element described with respect to FIG. 11 or otherwise) may be configured to communicate via a communications network 1150. Examples of communication networks are further described with respect to FIG. 13. Finally, any of the elements of the system 1100 may include any of the elements of the computing device 1300 as well.

Figure 12A:
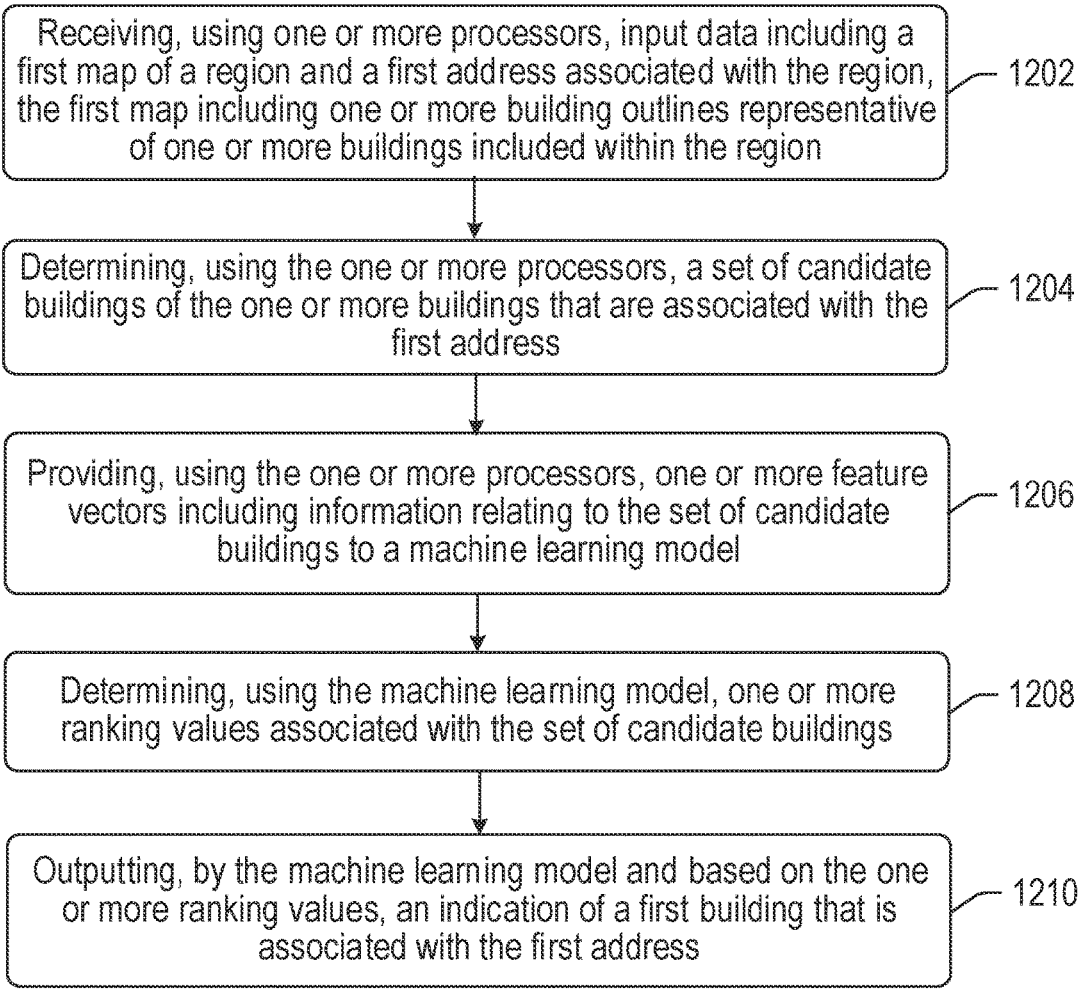
FIG. 12A illustrates an example method in accordance with one or more example embodiments of the disclosure.

FIG. 12A depicts an example method 1200 in accordance with one or more example embodiments of the disclosure. The method 1200 may be performed using computer-executable instructions stored on the memory of a device or system (for example, user device 1102, computing system 1120, computing device 1300, and/or any other device or system described herein or otherwise).

At block 1202 of the method 1200, computer-executable instructions stored on the memory of a device or system may be executed to receive, using one or more processors, input data including a first map of a region and a first address associated with the region, the first map including one or more building outlines representative of one or more buildings included within the region.

At block 1204 of the method 1200, computer-executable instructions stored on the memory of a device or system may be executed to determine, using the one or more processors, a set of candidate buildings of the one or more buildings that are associated with the first address. In one or more embodiments, the set of candidate buildings may be determined by creating a bounding box based on delivery scan points as shown above with respect to FIG. 7. As aforementioned, the bounding box may be created by determining KDE values for some or all of the delivery scan points associated with the address and using the maximum KDE score delivery scan point and the second maximum KDE delivery scan point to generate the bounding box. The bounding box may also be expanded by a given amount as well. The amount that the bounding box is expanded may be a pre-determined value or may depend on one or more factors, such as the GPS accuracy in the particular region. The bounding box may also be generated using any other methods described herein or otherwise and/or the candidate buildings may be identified in any other manner as well.

At block 1206 of the method 1200, computer-executable instructions stored on the memory of a device or system may be executed to provide, using the one or more processors, one or more feature vectors including information relating to the set of candidate buildings to a machine learning model. In one or more embodiments, a first feature vector and a second feature vector may be provided to the model. The first feature vector may include building features of a candidate building for an address. The second feature vector may include background features that are specific to an address but have the same values for all candidate buildings. However, any other number of feature vectors may also be provided to the model. Additionally, input data may be provided to the model in any other format other than feature vectors as well.

At block 1208 of the method 1200, computer-executable instructions stored on the memory of a device or system may be executed to determine, using the machine learning model, one or more ranking values associated with the set of candidate buildings. Specifically, the list of candidate buildings may be split into pairs of candidate buildings such that a group of pairs including all possible combination pairs of the candidate buildings are formed. Once these candidate buildings are formed, the model may use the input data to determine, for each pair of candidate buildings, which candidate building of the two candidate buildings has a higher likelihood of being associated with the address. This probability for each pair may be the output of the model. Every time a building is associated with a higher probability value (e.g., a building "wins" over its candidate building pairing), a count associated with the building may be incremented. The building with the most "wins" among the candidate building pairs (e.g., the highest count) may then be assigned the address and the address label may be provided within the building outline corresponding to that building on the map. That is, a second map may be generated including an indication of the first address within a first building outline representative of a first building (e.g., the building with the most "wins").

At block 1210 of the method 1200, computer-executable instructions stored on the memory of a device or system may be executed to output, by the machine learning model and based on the one or more ranking values, an indication of a first building that is associated with the first address.

Figure 12B:
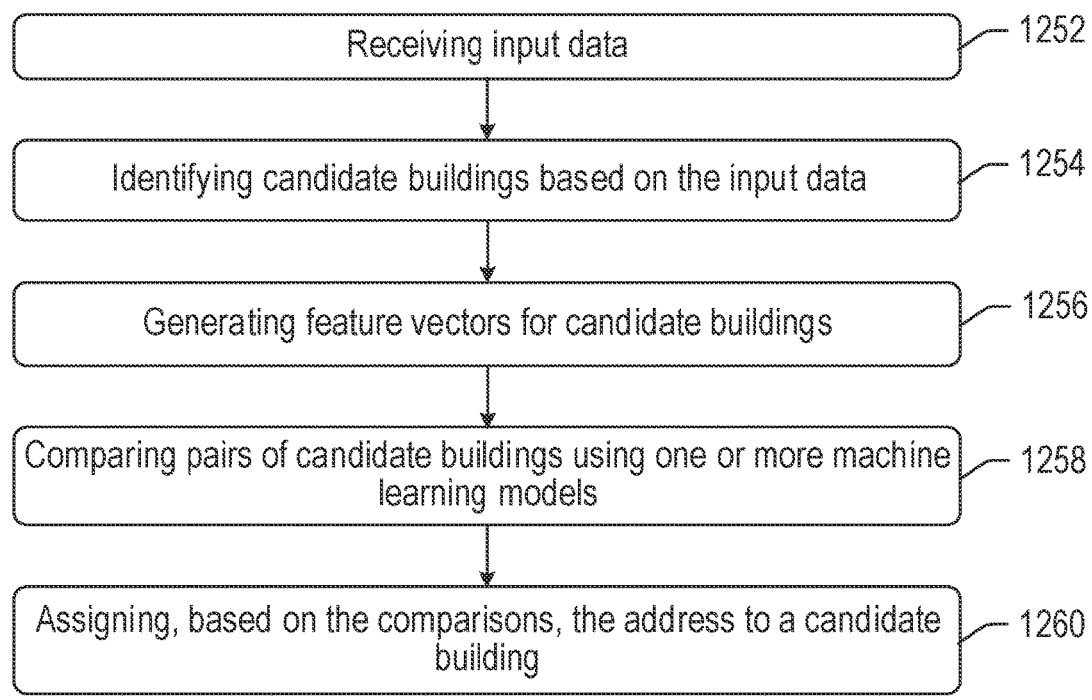
FIG. 12B illustrates another example method in accordance with one or more example embodiments of the disclosure.

FIG. 12B depicts another example method 1250 in accordance with one or more example embodiments of the disclosure. The method 1250 may be performed using computer-executable instructions stored on the memory of a device or system (for example, user device 1102, computing system 1120, computing device 1300, and/or any other device or system described herein or otherwise).

At block 1252 of the process flow 1200, computer-executable instructions stored on the memory of a device or system may be executed to receive input data. For example, the input data may include an indication of an address associated with a region, an indication of buildings included within the region (for example, based on building outlines included within map data), delivery point scans associated with the address as described herein, and/or any other input data described herein or otherwise.

At block 1254 of the process flow 1200, computer-executable instructions stored on the memory of a device or system may be executed to identify candidate buildings based on the input data. For example, the candidate buildings may be determined by generating a bounding box using the delivery point scan data as described with respect to FIG. 7.

At block 1256 of the process flow 1200, computer-executable instructions stored on the memory of a device or system may be executed to generate feature vectors for the candidate buildings. In one or more embodiments, two different types of feature vectors may be provided to the ranking model. The first feature vector may include building features of a candidate building for an address. The second feature vector may include background features that are specific to an address but have the same values for all candidate buildings. For the pairwise ranking model, differences between a pair of buildings and some address background features form a feature vector with a binary target of whether a first building is better than a second building to associate with a particular address. While reference is made to two feature vectors including particular types of information being provided to the model, any other types of data described herein or otherwise may also be provided to the model as well.

At block 1258 of the process flow 1200, computer-executable instructions stored on the memory of a device or system may be executed to compare pairs of candidate buildings using one or more machine learning models. That is, the list of candidate buildings may be grouped into pairs of candidate buildings such that pairs including all possible combination pairs of the candidate buildings are formed. Once these candidate buildings pairings are formed, the model may use the input data to determine, for each pair of candidate buildings, which candidate building of the two candidate buildings has a higher likelihood of being associated with the address. This probability for each pair may be the output of the model. Every time a building is associated with a higher probability value (e.g., a building "wins" over its candidate building pairing), a count associated with the building may be incremented. The building with the most "wins" among the candidate building pairs (e.g., the highest count) may then be assigned the address, and the address label may be provided within the building outline corresponding to that building on the map. In one or more embodiments, a random forest binary classification model may be used; however, this is not intended to be limiting.

At block 1260 of the process flow 1200, computer-executable instructions stored on the memory of a device or system may be executed to assign, based on the comparisons, the address to a candidate building. For example, the building that is identified as being associated with the most "wins" among the candidate buildings as determined in block 1258 may be assigned the address.

One or more operations of the methods, process flows, or use cases of FIGS. 1-12 may have been described above as being performed by a user device, or more specifically, by one or more program module(s), applications, or the like executing on a device. It should be appreciated, however, that any of the operations of the methods, process flows, or use cases of FIGS. 1-12 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-12 may be described in the context of the illustrative devices, it should be appreciated that such operations may be implemented in connection with numerous other device configurations.

The operations described and depicted in the illustrative methods, process flows, and use cases of FIGS. 1-12 may be carried out or performed in any suitable order as desired in various example embodiments of the disclosure. Additionally, in certain example embodiments, at least a portion of the operations may be carried out in parallel. Furthermore, in certain example embodiments, fewer, more, or different operations than those depicted in FIGS. 1-12 may be performed.

Figure 13:
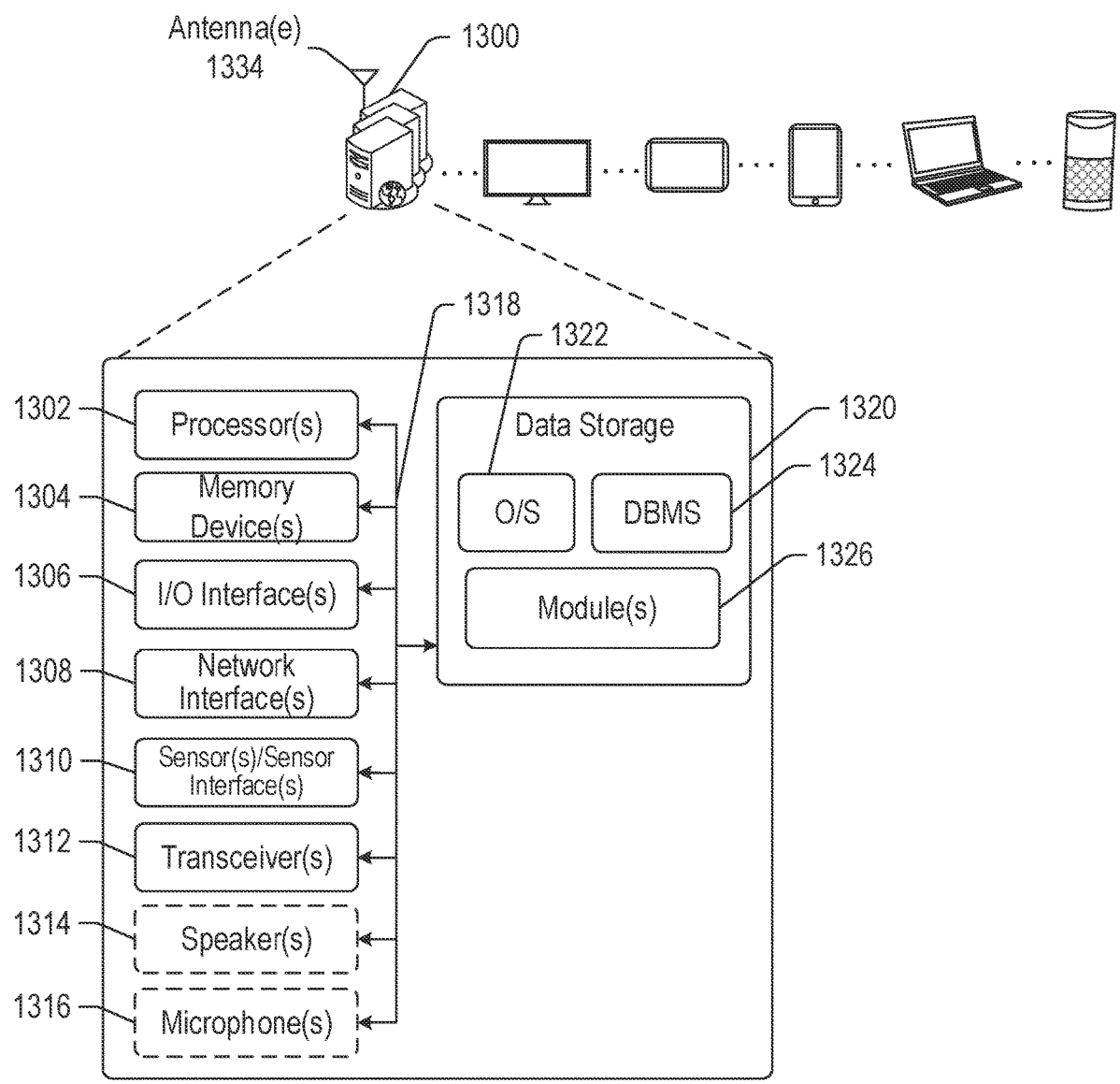
FIG. 13 is a block diagram of an illustrative computing device in accordance with one or more example embodiments of the disclosure.

FIG. 13 is a schematic block diagram of an illustrative computing device 1300 in accordance with one or more example embodiments of the disclosure. The computing device 1300 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The computing device 1300 may represent various components that may be included in any system or device described herein (for example, user device 1102, computing system 1120, and/or any other system or device).

The computing device 1300 may be configured to communicate via one or more networks with one or more servers, search engines, user devices, or the like. In some embodiments, a single remote server or a single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 1300 may include one or more processor(s) 1302, one or more memory devices 1304 (generically referred to herein as memory 1304), one or more input/output (I/O) interface(s) 1306, one or more network interface(s) 1308, one or more sensors or sensor interface(s) 1310, one or more transceivers 1312, one or more optional speakers 1314, one or more optional microphones 1316, and data storage 1320. The computing device 1300 may further include one or more buses 1318 that functionally couple various components of the computing device 1300. The computing device 1300 may further include one or more antenna (e) 1334 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1318 may include at least one of a system bus, the memory bus, an address bus, or a message bus, and may permit exchange of information (e.g., data (including computer-executable code), signaling, etc.) between various components of the computing device 1300. The bus(es) 1318 may include, without limitation, the memory bus or the memory controller, a peripheral bus, an accelerated graphics port, and so forth. The bus(es) 1318 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1304 of the computing device 1300 may include volatile memory (memory that maintains its state when supplied with power) such as random-access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1304 may include multiple different types of memory, such as various types of static random-access memory (SRAM), various types of dynamic random-access memory (DRAM), various types of unalterable ROM, and/or writeable variants of ROM such as electrically erasable programmable read-only memory (EEPROM), flash memory, and so forth. The memory 1304 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1320 may include removable storage and/or non-removable storage including, but not limited to, magnetic storage, optical disk storage, and/or tape storage. The data storage 1320 may provide non-volatile storage of computer-executable instructions and other data. The memory 1304 and the data storage 1320, removable and/or non-removable, are examples of computer-readable storage media (CRSM) as that term is used herein.

The data storage 1320 may store computer-executable code, instructions, or the like that may be loadable into the memory 1304 and executable by the processor(s) 1302 to cause the processor(s) 1302 to perform or initiate various operations. The data storage 1320 may additionally store data that may be copied to memory 1304 for use by the processor(s) 1302 during the execution of the computer-executable instructions. Moreover, output data generated as a result of execution of the computer-executable instructions by the processor(s) 1302 may be stored initially in memory 1304 and may ultimately be copied to data storage 1320 for non-volatile storage.

More specifically, the data storage 1320 may store one or more operating systems (O/S) 1322; one or more database management systems (DBMS) 1324; and one or more program module(s), applications, engines, computer-executable code, scripts, or the like. Some or all of these module(s) may be sub-module(s). Any of the components depicted as being stored in data storage 1320 may include any combination of software, firmware, and/or hardware. The software and/or firmware may include computer-executable code, instructions, or the like that may be loaded into the memory 1304 for execution by one or more of the processor(s) 1302. Any of the components depicted as being stored in data storage 1320 may support the functionality described in reference to correspondingly named components earlier in this disclosure.

The data storage 1320 may further store various types of data utilized by components of the computing device 1300. Any data stored in the data storage 1320 may be loaded into the memory 1304 for use by the processor(s) 1302 in executing computer-executable code. In addition, any data depicted as being stored in the data storage 1320 may potentially be stored in one or more datastore(s) and may be accessed via the DBMS 1324 and loaded in the memory 1304 for use by the processor(s) 1302 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 13, the datastore(s) may include, for example, purchase history information, user action information, user profile information, a database linking search queries and user actions, and other information.

The processor(s) 1302 may be configured to access the memory 1304 and execute computer-executable instructions loaded therein. For example, the processor(s) 1302 may be configured to execute computer-executable instructions of the various program module(s), applications, engines, or the like of the computing device 1300 to cause or facilitate various operations to be performed in accordance with one or more embodiments of the disclosure. The processor(s) 1302 may include any suitable processing unit capable of accepting data as input, processing the input data in accordance with stored computer-executable instructions, and generating output data. The processor(s) 1302 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1302 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1302 may be capable of supporting any of a variety of instruction sets.

Referring now to functionality supported by the various program module(s) depicted in FIG. 13, the module(s) 1326 may include computer-executable instructions, code, or the like that responsive to execution by one or more of the processor(s) 1302 may perform functions including, but not limited to, performing any functionality associated with the determination of a building with which to associate a particular address and/or any other tasks described here or otherwise (e.g., data pre-processing, model training, model determinations, etc.).

Referring now to other illustrative components depicted as being stored in the data storage 1320, the O/S 1322 may be loaded from the data storage 1320 into the memory 1304 and may provide an interface between other application software executing on the computing device 1300 and the hardware resources of the computing device 1300. More specifically, the O/S 1322 may include a set of computer-executable instructions for managing the hardware resources of the computing device 1300 and for providing common services to other application programs (e.g., managing memory allocation among various application programs). In certain example embodiments, the O/S 1322 may control execution of the other program module(s) to dynamically enhance characters for content rendering. The O/S 1322 may include any operating system now known or which may be developed in the future including, but not limited to, any server operating system, any mainframe operating system, or any other proprietary or non-proprietary operating system.

The DBMS 1324 may be loaded into the memory 1304 and may support functionality for accessing, retrieving, storing, and/or manipulating data stored in the memory 1304 and/or data stored in the data storage 1320. The DBMS 1324 may use any of a variety of database models (e.g., relational model, object model, etc.) and may support any of a variety of query languages. The DBMS 1324 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 1300 is a mobile device, the DBMS 1324 may be any suitable lightweight DBMS optimized for performance on a mobile device.

Referring now to other illustrative components of the computing device 1300, the input/output (I/O) interface(s) 1306 may facilitate the receipt of input information by the computing device 1300 from one or more I/O devices as well as the output of information from the computing device 1300 to the one or more I/O devices. The I/O devices may include any of a variety of components, such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 1300 or may be separate. The I/O devices may further include, for example, any number of peripheral devices such as data storage devices, printing devices, and so forth.

The I/O interface(s) 1306 may also include an interface for an external peripheral device connection, such as universal serial bus (USB), FireWire, Thunderbolt, Ethernet port or other connection protocol that may connect to one or more networks. The I/O interface(s) 1306 may also include a connection to one or more of the antenna (e) 1334 to connect to one or more networks via a wireless local area network (WLAN) (such as Wi-Fi) radio, Bluetooth, ZigBee, and/or a wireless network radio, such as a radio capable of communication with a wireless communication network, such as a Long Term Evolution (LTE) network, WiMAX network, 3G network, ZigBee network, etc.

The computing device 1300 may further include one or more network interface(s) 1308 via which the computing device 1300 may communicate with any of a variety of other systems, platforms, networks, devices, and so forth. The network interface(s) 1308 may enable communication, for example, with one or more wireless routers, one or more host servers, one or more web servers, and the like via one or more of networks.

The antenna (e) 1334 may include any suitable type of antenna depending, for example, on the communications protocols used to transmit or receive signals via the antenna (c) 1334. Nonlimiting examples of suitable antennas may include directional antennas, non-directional antennas, dipole antennas, folded dipole antennas, patch antennas, multiple-input multiple-output (MIMO) antennas, or the like. The antenna (e) 1334 may be communicatively coupled to one or more transceivers 1312 or radio components to which or from which signals may be transmitted or received.

As previously described, the antenna (c) 1334 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA). CDMA2000. etc.), 4G standards (e.g., Long-Term Evolution (LTE), WiMax, etc.), direct satellite communications, or the like.

The antenna (c) 1334 may additionally, or alternatively, include a Wi-Fi antenna configured to transmit or receive signals in accordance with established standards and protocols, such as the IEEE 802.11 family of standards, including via 2.4 GHZ channels (e.g., 802.11b, 802.11g. 802.11n), 5 GHz channels (e.g., 802.11n, 802.11ac), or 60 GHz channels (e.g., 802.11ad). In alternative example embodiments, the antenna (e) 1334 may be configured to transmit or receive radio frequency signals within any suitable frequency range forming part of the unlicensed portion of the radio spectrum.

The antenna (c) 1334 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1312 may include any suitable radio component(s) for—in cooperation with the antenna (c) 1334—transmitting or receiving radio frequency (RF) signals in the bandwidth and/or channels corresponding to the communications protocols utilized by the computing device 1300 to communicate with other devices. The transceiver(s) 1312 may include hardware, software, and/or firmware for modulating, transmitting, or receiving—potentially in cooperation with any of antenna (e) 1334—communications signals according to any of the communications protocols discussed above including, but not limited to, one or more Wi-Fi and/or Wi-Fi direct protocols, as standardized by the IEEE 802.5 standards, one or more non-Wi-Fi protocols, or one or more cellular communications protocols or standards. The transceiver(s) 1312 may further include hardware, firmware, or software for receiving GNSS signals. The transceiver(s) 1312 may include any known receiver and baseband suitable for communicating via the communications protocols utilized by the computing device 1300. The transceiver(s) 1312 may further include a low noise amplifier (LNA), additional signal amplifiers, an analog-to-digital (A/D) converter, one or more buffers, a digital baseband, or the like.

The sensor(s)/sensor interface(s) 1310 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 1314 may be any device configured to generate audible sound. The optional microphone(s) 1316 may be any device configured to receive analog sound input or voice data.

It should be appreciated that the program module(s), applications, computer-executable instructions, code, or the like depicted in FIG. 13 as being stored in the data storage 1320 are merely illustrative and not exhaustive and that processing described as being supported by any particular module alternatively may be distributed across multiple module(s) or performed by a different module. In addition, various program module(s), script(s), plug-in(s), Application Programming Interface(s) (API(s)), or any other suitable computer-executable code hosted locally on the computing device 1300, and/or hosted on other computing device(s) accessible via one or more networks, may be provided to support functionality provided by the program module(s), applications, or computer-executable code depicted in FIG. 13 and/or additional or alternate functionality. Further, functionality may be modularized differently such that processing described as being supported collectively by the collection of program module(s) depicted in FIG. 13 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model, such as, for example, a client-server model, a peer-to-peer model, and so forth. In addition, any of the functionalities described as being supported by any of the program module(s) depicted in FIG. 13 may be implemented, at least partially, in hardware and/or firmware across any number of devices.

It should further be appreciated that the computing device 1300 may include alternate and/or additional hardware, software, or firmware components beyond those described or depicted without departing from the scope of the disclosure. More particularly, it should be appreciated that software, firmware, or hardware components depicted as forming part of the computing device 1300 are merely illustrative and that some components may not be present or additional components may be provided in various embodiments. While various illustrative program module(s) have been depicted and described as software module(s) stored in data storage 1320, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for case of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments; while, in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random-access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium that can be used to store the information and can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving, using one or more processors, input data including a first map of a region, a first address associated with the region, and a second address associated with the region, the first map including building outlines representative of buildings included within the region;
receiving, using the one or more processors, first historical data including first indicated delivery locations for first deliveries associated with the first address, and second historical data including second indicated delivery locations for second deliveries associated with the second address;
determining, using the one or more processors and based on the first historical data and the second historical data, a first bounding box including at least some of the first indicated delivery locations and a second bounding box including at least some of the second indicated delivery locations;
determining, using the one or more processors, that a first set of building outlines of the building outlines are at least partially within the first bounding box and a second set of building outlines of the building outlines are at least partially within the second bounding box, wherein a first building outline of the first set of building outlines and a second building outline of the second set of building outlines are both at least partially within both of the first bounding box and the second bounding box;
determining, using the one or more processors, a first set of candidate buildings of the buildings that are associated with the first address and a second set of candidate buildings of the one or more-buildings that are associated with the second address, the first set of candidate buildings including the first set of building outlines, and the second set of candidate buildings including the second set of building outlines;
providing, using the one or more processors, a first feature vector and a second feature vector to a machine learning model, wherein the first feature vector includes features associated with an individual building of the first set of candidate buildings, and wherein the second feature vector includes features shared by all buildings included within the first set of candidate buildings;
providing, using the one or more processors, a third feature vector and a fourth feature vector to the machine learning model, wherein the third feature vector includes features associated with an individual building of the second set of candidate buildings, and wherein the fourth feature vector includes features shared by all buildings included within the second set of candidate buildings;
determining, using the machine learning model, first ranking values associated with the first set of candidate buildings and second ranking values associated with the second set of candidate buildings;
outputting, by the machine learning model and based on the first ranking values and the second ranking values, an indication of a first building of the first set of candidate buildings that is associated with the first address and a second building of the second set of candidate buildings that is associated with the second address; and
generating a second map including an indication of the first address within a first building outline representative of the first building and an indication of the second address within the second building outline that is representative of the second building.

2. The method of claim 1, wherein determining the first set of candidate buildings further comprises:
determining that an area included within a third building outline is less than a threshold size; and
removing a third building associated with the third building outline from the first set of candidate buildings.

3. The method of claim 1, further comprising:
determining, using the first map, a road segment that is associated with the first set of candidate buildings;
determining a line segment that passes through the road segment on the first map;
shifting the line segment towards the first set of building outlines associated with the first set of candidate buildings;
determining that the line segment intersects more than a threshold number of building outlines included in the first set of candidate buildings; and
determining an order sequence of the first set of candidate buildings based on the determination that the line segment intersects more than the threshold number of building outlines.

4. The method of claim 1, further comprising:
determining a convex hull that intersects the first set of candidate buildings;
determining distances between the first set of candidate buildings and a starting point of a road segment corresponding to the first set of candidate buildings; and
determining an order sequence of the first set of candidate buildings based on the distances.

5. A method comprising:
receiving, using one or more processors, input data including a first map of a region and a first address associated with the region, the first map comprising building outlines representative of buildings included within the region, the building outlines comprising a first building outline and a second building outline;
determining, using the one or more processors, a set of candidate buildings of the buildings that are associated with the first address;
determining that a size of the second building outline is less than a threshold size;
determining, based on determining that the size is less than the threshold size, that a second building associated with the second building outline is a non-delivery structure;
removing, based on determining that the second building is a non-delivery structure, the second building associated with the second building outline from the set of candidate buildings;
providing, using the one or more processors, feature vectors including information relating to the set of candidate buildings to a machine learning model;
determining, using the machine learning model, a ranking value for each candidate building of the set of candidate buildings, wherein a first ranking value for a first building of the set of candidate buildings indicates a likelihood that the first building of the set of candidate buildings is associated with the first address instead of a second address; and
outputting, by the machine learning model and based on the first ranking value, an indication that the first building is associated with the first address.

6. The method of claim 5, further comprising:
generating a second map including an indication of the first address within the first building outline representative of the first building.

7. The method of claim 5, wherein determining the set of candidate buildings further comprises:
receiving historical data including indicated delivery locations for deliveries associated with the first address;
determining, based on the historical data, a bounding box including at least some of the indicated delivery locations; and
determining that building outlines associated with the set of candidate buildings are at least partially within the bounding box.

8. The method of claim 5, wherein the feature vectors comprise a first feature vector and a second feature vector, wherein the first feature vector includes features associated with an individual building of the set of candidate buildings, and wherein the second feature vector includes features shared by all buildings included within the set of candidate buildings.

9. The method of claim 5, further comprising:
determining, using the first map, a road segment that is associated with the set of candidate buildings;
determining a line segment through a length of the road segment on the first map;
shifting the line segment towards a set of building outlines associated with the set of candidate buildings;
determining that the line segment intersects more than a threshold number of building outlines included in the set of candidate buildings; and
determining an order sequence of the set of candidate buildings based on the determination that the line segment intersects more than the threshold number of building outlines.

10. The method of claim 5, further comprising:
determining a convex hull that intersects the set of candidate buildings;
determining distances between the set of candidate buildings and a starting point of a road segment corresponding to the set of candidate buildings; and
determining an order sequence of the set of candidate buildings based on the distances.

11. The method of claim 5, further comprising determining a normalized format of the first address.

12. A system comprising:
a memory that stores computer-executable instructions; and
one or more processors configured to access the memory and execute the computer-executable instructions to:
receive input data including a first map of a region and a first address associated with the region, the first map comprising building outlines representative of buildings included within the region;
determine a set of candidate buildings of the buildings that are associated with the first address;
determine, using the first map, a road segment that is associated with the set of candidate buildings;
determine a line segment that passes through the road segment on the first map;
shifting the line segment towards a set of building outlines associated with the set of candidate buildings;
determine that the line segment intersects more than a threshold number of building outlines included in the set of candidate buildings;
determine an order sequence of the set of candidate buildings based on the determination that the line segment intersects more than the threshold number of building outlines;
provide feature vectors including information relating to the set of candidate buildings to a machine learning model;
determine, using the machine learning model, a ranking value for each candidate building of the set of candidate buildings, wherein a first ranking value for a first building of the set of candidate buildings indicates a likelihood that the first building of the set of candidate buildings is associated with the first address instead of a second address; and
output, by the machine learning model and based on the first ranking value, an indication that the first building is associated with the first address.

13. The system of claim 12, wherein the one or more processors are further configured to execute the computer-executable instructions to:
generate a second map including an indication of the first address within a first building outline representative of the first building.

14. The system of claim 12, wherein determining the set of candidate buildings further comprises:
receive historical data including indicated delivery locations for deliveries associated with the first address;

determine, based on the historical data, a bounding box including at least some of the indicated delivery locations; and determine that the set of building outlines associated with the set of candidate buildings are at least partially within the bounding box.

15. The system of claim 12, wherein the feature vectors comprise a first feature vector and a second feature vector, wherein the first feature vector includes features associated with an individual building of the set of candidate buildings, and wherein the second feature vector includes features shared by all buildings included within the set of candidate buildings.

16. The system of claim 12, wherein determining the set of candidate buildings further comprises:

determine that a size of a second building outline is less than a threshold size;

determine, based on determining that the size is less than the threshold size, that a second building associated with the second building outline is a non-delivery structure; and remove, based on determining that the second building is a non-delivery structure, the second building associated with the second building outline from the set of candidate buildings.

17. The system of claim 12, wherein the one or more processors are further configured to execute the computer-executable instructions to:

determine a convex hull that intersects the set of candidate buildings;

determine distances between the set of candidate buildings and a starting point of the road segment corresponding to the set of candidate buildings; and determine the order sequence of the set of candidate buildings further based on the distances.

18. The system of claim 12, wherein the one or more processors are further configured to execute the computer-executable instructions to:

determine a normalized format of the first address.

* * * * *